A. M. BATES.
BAG TYING MACHINE.
APPLICATION FILED MAY 10, 1915.

1,272,603.

Patented July 16, 1918.
7 SHEETS—SHEET 1.

Fig. 1.

Witnesses
Edward T. Wray
Bessie S. Rice

Inventor
Adelmer M. Bates
by Parker Cole
Attorneys.

A. M. BATES.
BAG TYING MACHINE.
APPLICATION FILED MAY 10, 1915.

1,272,603.

Patented July 16, 1918
7 SHEETS—SHEET 6.

Witnesses.
Edward T. Wray.
Bessie S. Rice.

Inventor.
Adelmer M. Bates
by Parker Carter
Attorneys.

UNITED STATES PATENT OFFICE.

ADELMER M. BATES, OF CHICAGO, ILLINOIS, ASSIGNOR TO BATES VALVE BAG COMPANY, OF CHICAGO, ILLINOIS, A CORPORATION OF WEST VIRGINIA.

BAG-TYING MACHINE.

1,272,603.  Specification of Letters Patent.  Patented July 16, 1918.

Application filed May 10, 1915. Serial No. 27,002.

*To all whom it may concern:*

Be it known that I, ADELMER M. BATES, a citizen of the United States, residing at Chicago, in the county of Cook and State of Illinois, have invented a certain new and useful Improvement in Bag-Tying Machines, of which the following is a specification.

My invention relates to improvements in bag-tying machines, and has for one object to provide means for first forming a tie, and then applying the tie so formed to and twisting it about the neck of a bag to close the bag, in such manner that the tie is never released by the machine until it is released with the bag. Another object of my invention is to provide means for rapidly tying up and closing the necks of bags. Another object of my invention is to provide means for suitably controlling and handling a bag tie after it is formed and before it has been applied to the neck of the bag. Other objects of my invention will appear in the specification. The invention is illustrated more or less diagrammatically in the accompanying drawings, wherein—

Like parts are indicated by the same letter in all the figures.

A is a combined housing, support, and closure. It carries the wire tie forming and feeding devices, the bag supporting and feeding device, and the tying or twisting mechanism. It contains the driving and controlling mechanism for all these devices.

Since my machine is expected to manufacture or prepare the ties and then apply them to the bag without losing control of them, it is obvious that the formation of the tie, the feeding of the formed tie to the bag, and the twisting of the tie around the bag must be closely correlated so that there will be no loss or disarrangement of the ties, and no interruption in the supply of ties. This close correlation of all the operations is obtained by the use of a single master timing gear $A^1$, mounted on and rotating with a shaft $A^2$ supported in a main bearing $A^3$. This gear is driven by an electric motor $A^4$ operating through a chain of reduction gears, and from this gear and the shaft carrying it is taken the power for performing all the functions of my machine.

Tie forming mechanism.

Figures 15, 16:
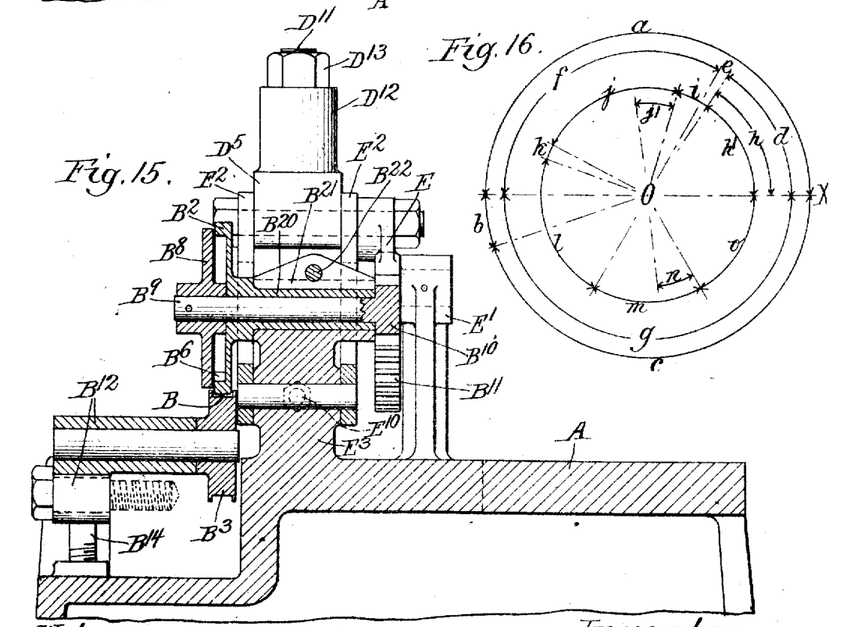
Fig. 15 is a section along the line 15—15 of Fig. 11.
Fig. 16 is a diagram indicating the timing of the different operations in terms of revolutions of the main timing gear.
Figure 17:
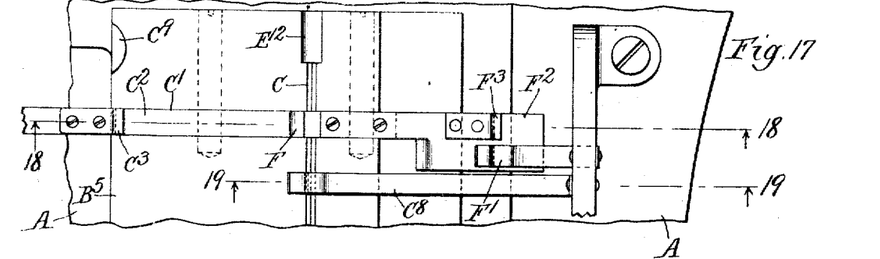
Fig. 17 is a plan view of a portion of the tie feeding means.
Figure 18:
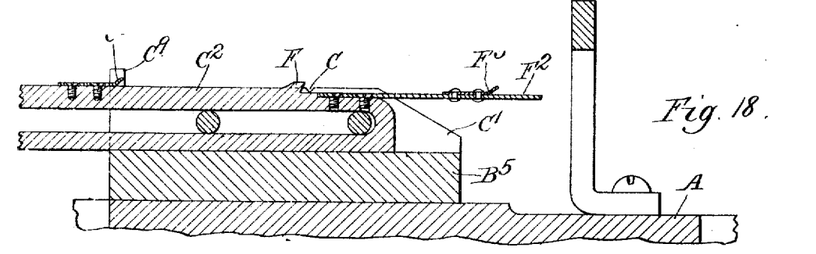
Fig. 18 is a section along the line 18—18 of Fig. 17.
Figure 19:
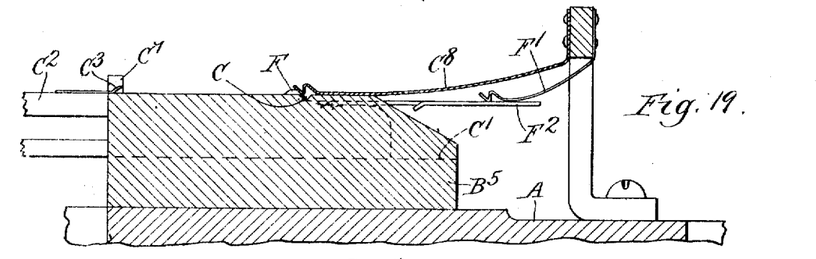
Fig. 19 is a section along the line 19—19 of Fig. 17.
Figure 20:
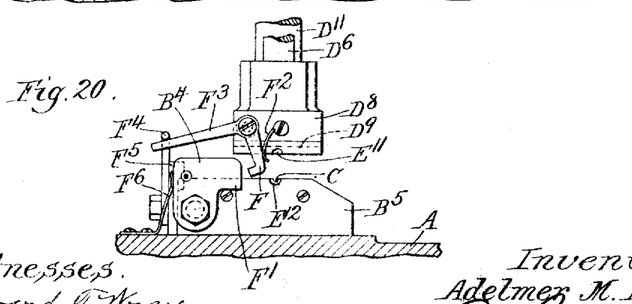
Fig. 20 is a section along the line 20—20 of Fig. 11.

The wire B is led over the guide pulley $B^1$, passes between the feed rolls $B^2$, $B^3$, and through the guide block $B^4$, and across the table $B^5$. The table $B^5$ is substantially the same length as the tie blank. The larger feed roll is of such diameter that about one half its circumference is substantially equal to the same length. This feed roll $B^2$ as indicated in Fig. 15 is mounted on a sleeve $B^{20}$ in an adjustable split bearing $B^{21}$, the bearing $B^{21}$ being provided with an adjusting screw $B^{22}$, whereby the sleeve $B^{20}$ is clamped sufficiently to prevent backlash. The inside of the roll B² is provided with two diametrically opposed shoulders B⁶ adapted to be engaged by a pawl B⁷ on the driving disk B⁸. This driving disk is mounted on a shaft B⁹, free to rotate in the sleeve B²⁰, and carrying at its opposed end a pinion B¹⁰. This pinion is in mesh with a segment B¹¹ of such size that the pinion makes one half revolution for each full movement of the segment. The roll B³ is mounted on a bell-crank lever B¹², and is thrust toward the surface of the feed roll B² by a spring B¹³ adjustable by means of the cap screw B¹⁴ to control the tension or pressure between the two rolls.

The table B⁵ is provided in its surface with a groove C, parallel with the line along which the wire is fed to the table. The table is also transversely slotted as indicated at C¹, C¹, and in these slots are slidably mounted the feed bars C². These feed bars carry wire-engaging hooks C³, C³, which are adapted to grip the tie blank and feed it laterally to the groove. This sliding feed movement of the reciprocating feed bars C² is caused by the reciprocation of the links C⁴ acting through the rock levers C⁵, shafts C⁶, and the links C⁷, the latter being, as shown, slidably and pivotally connected to the ends of the feed bars C². The spring fingers C⁸ overhang the groove C. They are upwardly curved at their ends, so that the wire when fed forward by the hooks C³, may pass beneath them. Their function is to hold the wire in the groove, and prevent its return with the rearward reciprocation of the feed bars C². C⁹, C⁹ are stops carried by the table B⁵ in order to prevent displacement of the blank in the wrong direction by the rearward movement of the feed strips C² before the blank is engaged by the hooks C³.

D is a crank mounted on the shaft A². It drives a connecting rod D¹, and this connecting rod in turn drives a crosshead D². The crosshead D² carries the guide rods D³, the upper ends of which carry a driving head D⁴. D⁵ is a yoke supported on the driving head D⁴. This yoke has downwardly projecting therefrom guide pins D⁶, and these guide pins are slidable in the bosses D⁷ on the presser foot D⁸. Coil springs D⁹ are interposed between the presser foot D⁸ and the yoke D⁵, and surround the pins D⁶. The presser foot D⁸ is of course adapted to move toward and from the table B⁵ in unison with the movement of the yoke and driving head. The presser foot D⁸ is slotted as at D⁹ to span the feed bars C² and the retaining fingers C⁸. D¹⁰ is a driving lug projecting from the presser foot D⁸, and to which are pivoted the links C⁴, so that as the presser foot moves up and down, the reciprocating feed bars C² will move back and forth in their grooves or slots in the table B⁵. D¹¹ is a guide bar projecting upwardly from the presser foot D⁸, slidable through the boss D¹² in the yoke D⁵, and D¹³ is a nut on the upper end of this pin to limit the downward movement of the presser foot with respect to the yoke.

The segment B¹¹ is mounted on a lever E, which lever is pivoted on the bracket E¹, and in slidable and rotatable engagement at its free end with the yoke D⁵. The links E², E², are pivoted at their lower ends each on a bracket E³ on the frame A, and are slidably and pivotally connected at their upper ends to the yoke D⁵, so that as the yoke moves up and down, these links rotate about their pivotal points on the frame, and thus operate as levers to move back and forth the header blocks E⁴, which are connected to the levers by the links E⁵. Thus, a toggle effect is obtained, and the header blocks are moved forward with great force toward the table B⁵. These blocks E⁴ are slidable along guides E⁶, and carry header dies E⁷ cupped at either end as indicated at E⁸. These header dies are held removably in position in the block by the clamping screws E⁹, and the adjusting screws E¹⁰. The presser foot D⁸ and the table B⁵ are both cut out and enlarged as shown at E¹¹, E¹², so that when the presser foot is in position on the table, a cylindrical chamber is formed into which the header die may penetrate, the end of the wire, of course, projecting out into such chamber free from the walls thereof, so that, as the two header dies are thrust into the two chambers, one on either end of the wire, the ends of the wire or blank will be curved about or upset into the shape shown in Fig. 13 to form the heads of the tie.

As the presser foot descends, the hook F, pivotally mounted thereon, is thrust into position beneath the tail F¹, on the guide block B⁴ by the spring F², because the downward movement of the presser foot will disengage the tailpiece F³ of the lever F from the stop F⁴, thus leaving the hook free to take hold of the guide block B⁴. As the presser foot goes up, the hook will cause the guide block B⁴ to rotate through a certain limited angle, and the wire passing through that guide block will be thrust against the knife F⁵ and cut off. The lever F³ will then engage the stop and further upward movement of the presser foot will release the guide block from the hook and permit it to be returned to its normal position by the spring F⁶, leaving the blank in position resting upon the table B⁵ ready to be moved or manipulated by the machine. The upward movement of the presser foot will also cause a reverse movement of the feed bars C² bringing the hooks C³ back of the blank and ready to engage it.

The ties are formed, and as formed lie in a position parallel to the position in which they are to be seized and manipulated by the tie twisting and bag tying mechanism, but in order to have room to operate, it is necessary that they be formed at a point removed from the point at which they are to be used. The feed strips C² are therefore used to feed the ties by a number of steps from the point where they are made to the point where they are used. In my preferred form, this is done by two movements of the completed tie. It might be done by a greater or less number of movements depending altogether on the proportions of the machine. The feed strips C² are provided with the hooks F. These hooks are so positioned with respect to the strips that the distance from the hook C³ to the hooks F is the same as the distance from the groove C to the line along which the wire is fed to the machine. As the feed strips are thrown back after the formation of the tie, these hooks are passed beyond the formed tie, the tie being held in position by the springs C⁸. The hooks then engage the tie, and when the presser foot commences to descend, the tie is carried forward by the hooks until it engages the spring hooks F¹. These spring hooks slide upon spring plates F² attached to the ends of the feeding strips C², and when the strip next recedes, these hooks hold the tie and prevent its return. They hold it until the hooks F³ on the spring plates F² engage the tie, and then on the next forward movement of the strips, these blanks are fed forward to the bag tying device.

*Bag tying mechanism.*

G is a rotatably mounted bag carrying table slotted about its periphery as indicated at G¹. In each of these slots is mounted a bag holding U-shaped member G², and in each member is a flat bag holding spring G³. Each of these springs is cut out at the ends and overlaps as indicated at G⁴, so that when a bag is fed by the operator between the guide fingers G⁵ the bag will be fed between the two springs, pressing them apart to afford its passage. As the bag is fed into the pocket formed by the two cut-out springs it will be puckered therein, and firmly clamped in position in the puckered form ready for tying. It will be understood that there might be any number of bag-feeding spring fingers, so that any number of operators might be employed to keep the plate G filled with bags, and each bag holder would always before entering the machine, have a bag in it. The table G is rotated by a cam G⁶ on the master timing gear A¹. This cam is in opposition to a cam roller G⁷ on a rocker arm G⁸, the rocker arm being rigidly mounted on a shaft G⁹ so that for each complete revolution of the master timing gear, the rock shaft will make one oscillation. The upper end of this shaft G⁹ carries a ratchet arm G¹⁰ and a spring ratchet dog G¹¹ in the end of it in opposition to the teeth G¹² carried by the table G. The spring G¹³ operates to hold the roller against the surface of the master gear, thus causing a return movement of the ratchet lever after each forward movement of the bag table. Thus the bag table makes one forward step to each revolution of the master gear. The operator who is placing the bags in the bag table thus has, as the time in which to do this act, the time occupied by the master gear in making one complete revolution.

Figure 14:
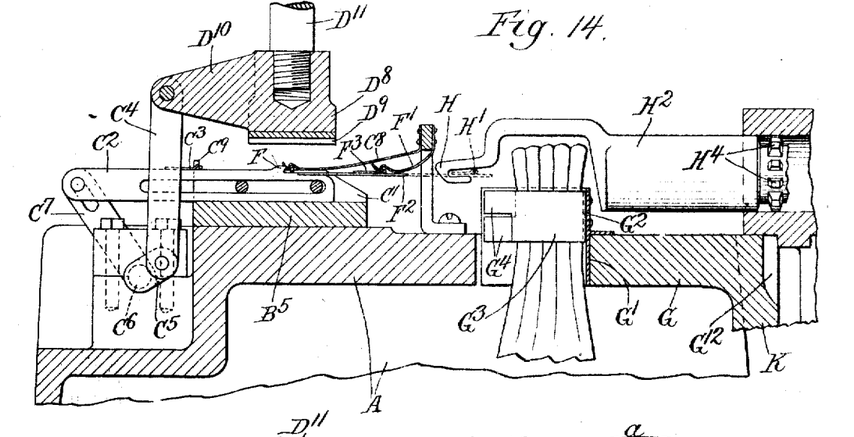
Fig. 14 is a section along the line 14—14 of Fig. 11.

After each forward movement of the table, a not yet tied bag is found in the position shown in Fig. 14, ready to have a tie twisted about it. At the same time, the downward movement of the presser foot will have caused the spring feed plate to carry a tie forward under the hooks H into the position shown at H¹. Soon after that time the hooks H which are mounted on a twisting bar H², are drawn back, passing on either side of the crimped neck of the bag, the wire being thus bent about the bag neck in a substantial U-shape. This is done by the rotation of the pinion H³ engaging the teeth H⁴ on the shaft H². This pinion is mounted on a shaft H⁵, the lower end of which carries a gear H⁶ in mesh with a pinion H⁷ on a shaft H⁸. H⁹ is a cam on the shaft H⁸, having a deep notch H¹⁰. This notch is engaged by a cam roller H¹¹, thrust thereinto by a spring H¹², so that the shaft H⁸, even if slightly displaced from the proper position of rest with the roller in the bottom of the notch, will be yieldingly returned thereto by a pressure of the spring. This applies, of course, only to slight accidental displacements of the shaft and not to the positively driven operative movement now to be described.

I, I¹, are two pinions on the lower end of the shaft H⁸. One of them lies in the path of the mutilated external gear I², the other in the path of the mutilated internal gear I³, so that as the two mutilated gears rotate in a counter clockwise direction as indicated by the arrow, the internal gear will first rotate the shaft H⁸ to withdraw the twisting hooks as above pointed out, and later the mutilated external gear will engage the smaller pinion to return the twisting hooks to their position as shown in Fig. 14. These two gears I², I³, are driven by a shaft I⁴, which in turn carries a miter gear I⁵ in mesh with the miter gear I⁶ in the master gear A¹. These two miter gears are the same size, so that the two miter gears make each one revolution for the one of the master gear, and thus there is one forward and one backward movement for each revolution of the master gear. The power available is of course sufficient to rotate the shaft H⁵ against the resistance furnished by the spring H¹⁰, but when the gears are out of mesh, the spring is sufficient to overcome any slight rotational tendency, and in any event to return the parts to their proper position after such rotational tendency has been overcome, or is no longer operative. With the twisting hooks drawn back, and the wire ties bent in a substantial U-shape about the puckered neck of the bag, it will be understood that the twisting movement now takes place, whereby the twisting hooks rotate to twist the tie about the neck of the bag.

Figure 1:
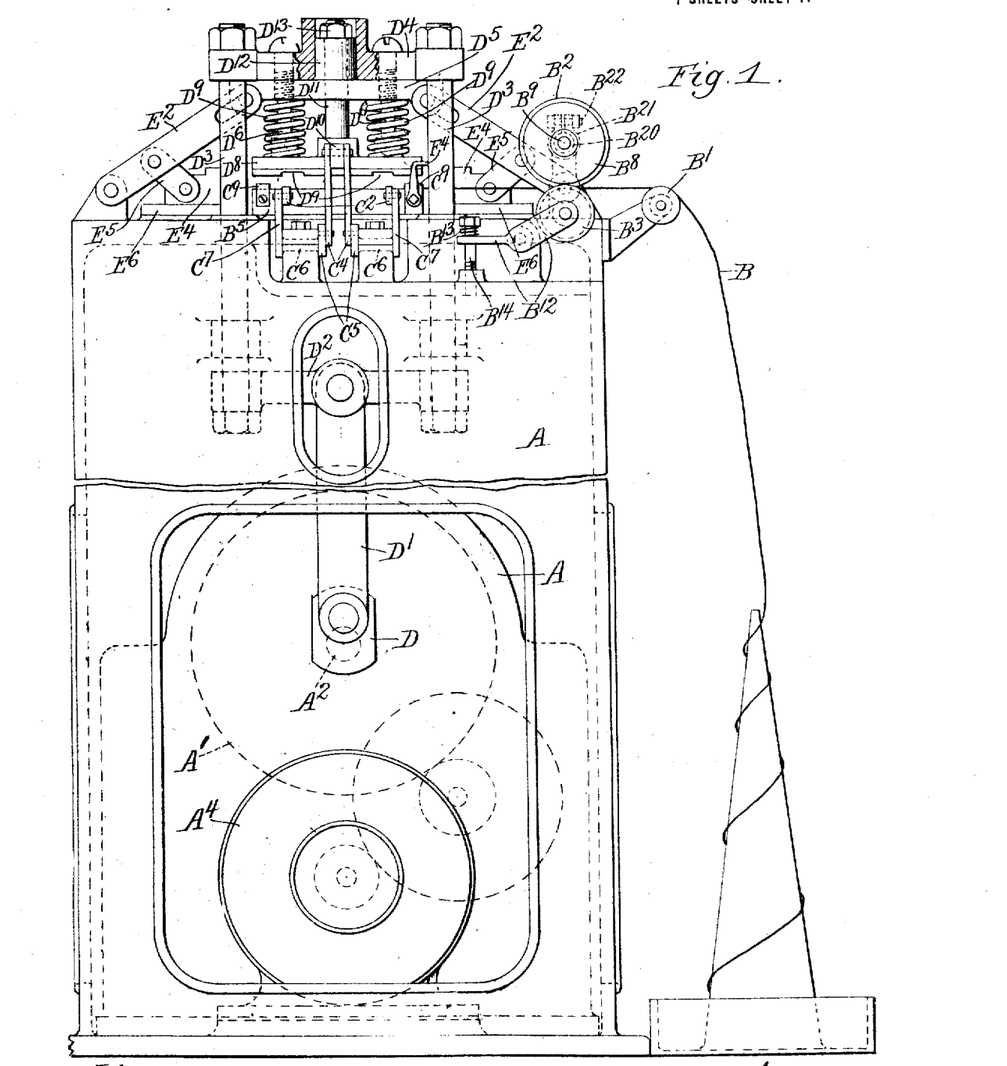
Figure 1 is a front elevation.
Figure 2:
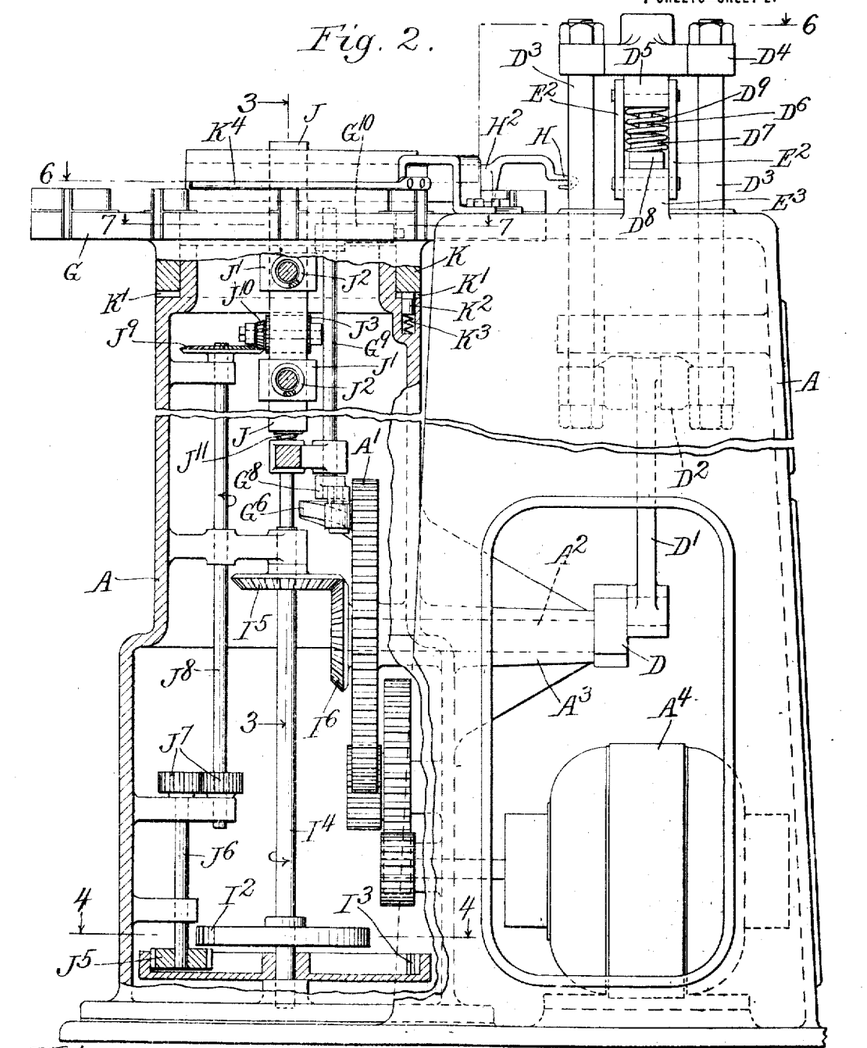
Fig. 2 is a side elevation in part section.
Figures 3, 4, 5:
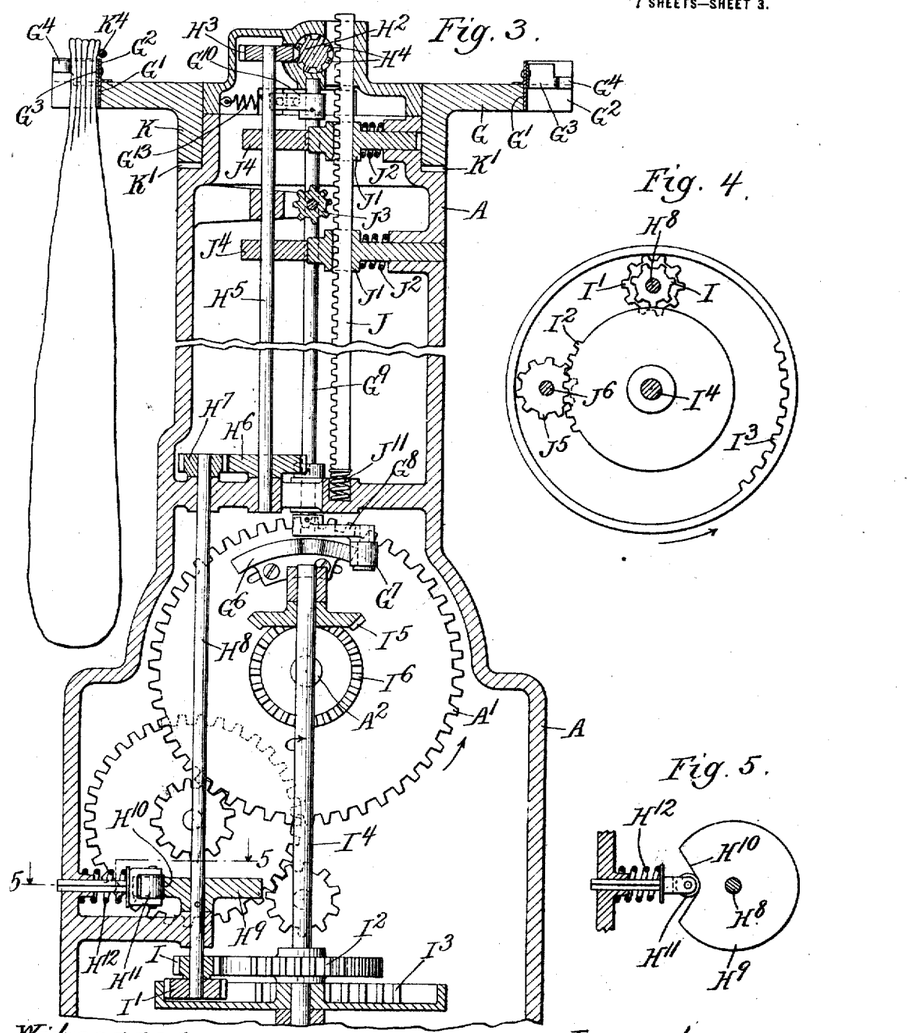
Fig. 3 is a section along the line 3—3 of Fig. 2.
Fig. 4 is a section along the line 4—4 of Fig. 2.
Fig. 5 is a section along the line 5—5 of Fig. 3.
Figures 6, 7, 8, 9, 10:
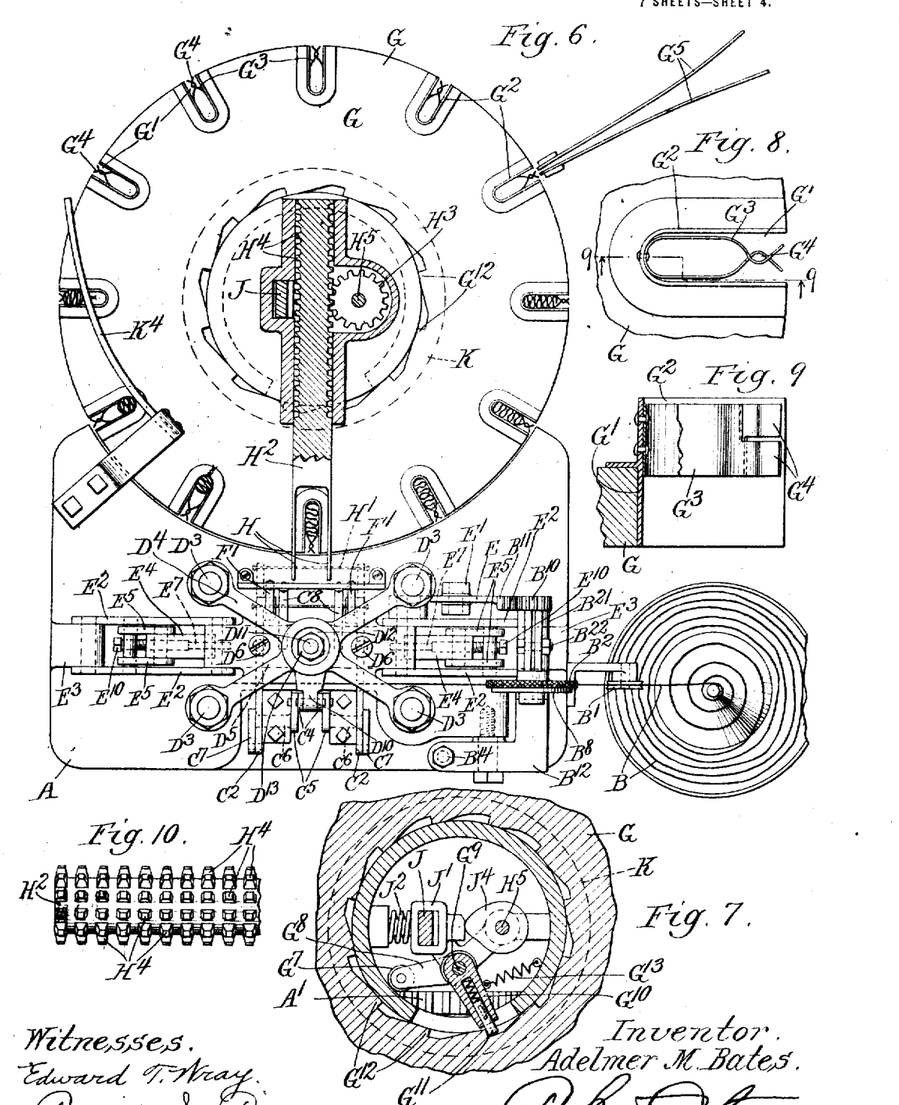
Fig. 6 is a section along the line 6—6 of Fig. 2.
Fig. 7 is a section along the line 7—7 of Fig. 2.
Fig. 8 is a detailed plan view of one of the bag holding pockets.
Fig. 9 is a section along the line 9—9 of Fig. 8.
Fig. 10 is a detail in elevation of a portion of the twisting spindle.

J is a rack mounted for reciprocation along a vertical line in the guide yokes J¹, J¹. These guide yokes are free to move back and forth in a horizontal plane, and are thrust by means of the springs J² toward the twisting bar H², tending to thrust the rack into engagement with the teeth H³ thereon, and also into mesh with the rack driving gear J³. This movement is resisted by cams J⁴ on the shaft H⁵. These cams are so timed that, when the twisting rod has been withdrawn, the cams will at that time have rotated to permit the rack to come into engagement with the twisting bar. At that time the pinion J⁵ will come into mesh with the mutilated gear J³, and the shaft J⁶ will be rotated in a counter clockwise direction, as indicated by the arrow. Thus, by means of the pinions J⁷ rotating the shaft J⁸ in a clockwise direction, the miter gear J⁹ being in mesh with the miter pinion J¹⁰ on the gear J³, will cause an upward movement of the rack J, and this will cause the twisting bar to rotate to twist the tie about the neck of the bag. After the rack has been raised up to the end of its excursion, the shaft H⁵ is rotated back to the position shown in Figs. 3 and 7, and will cause the cams to press the rack back, thus disengaging it both from its driving gear and from the twisting rod or spindle. The rack will then be no longer supported, and will drop back to its original position, being cushioned at the end of its fall by the spring J¹¹. Previous to this disengagement of the rack, however, the twisting rod will have been returned from the twisting position to the position it previously occupied before the tie was bent about the bag. The table will then rotate, and the operation be repeated.

The table G carries on its bottom a flange K, notched or serrated as at K¹. These notches are engaged by a wedge-shaped pin K², thrust yieldingly into them by a spring K³, so that after the driving mechanism has rotated the table to its proper position, it will be yieldingly held and positioned by this stop or pin to insure the accurate alining of the parts.

The twisting rod or spindle is provided with a series of teeth as above referred to. It will be noted that these teeth are arranged in annular groups about the periphery of the spindle, and that they are simultaneously arranged in straight lines along the axis of the spindle. Thus the spindle is free to move back and forth, even if the rack were in engagement, and may remain at all times in mesh with the gear which feeds it back and forth, without interfering with its rotation. The only reason for disengaging the rack at the end of the stroke is to obviate the necessity of turning the spindle on its return movement. K⁴ is a wedge or cam surface mounted on the housing A immediately above the bag carrying table on the discharge side thereof. It will be understood its function is to engage the neck of the tied bag, and gradually force it out of the holding pocket as the table is rotated. The inclination of its surface may be made as desired, so that the bag may be discharged at any suitable point, and dropped down into any suitable receptacle.

The use and operation of my invention are as follows:—

The large number of different functions of the different parts of the machine which must coöperate in order to perform the act of preparing a tie, feeding it forward, and twisting it about the bag, make it necessary for the time of a number of the different movements to overlap. The machine is a continuously operating one, and the master timing gear is always rotated at a fixed speed. The parts are so timed, that during each single rotation of the master timing gear, a blank is fed and cut, a tie is formed, and a tie is applied to and twisted about the neck of the bag. In order that the timing of the different acts and operations may be more easily understood, I have shown in Fig. 16 a diagrammatic angular lay out of the rotation of the master timing gear, and divided it up into angular divisions representing the different acts or movements of the different parts of the machine.

Figures 11, 13:
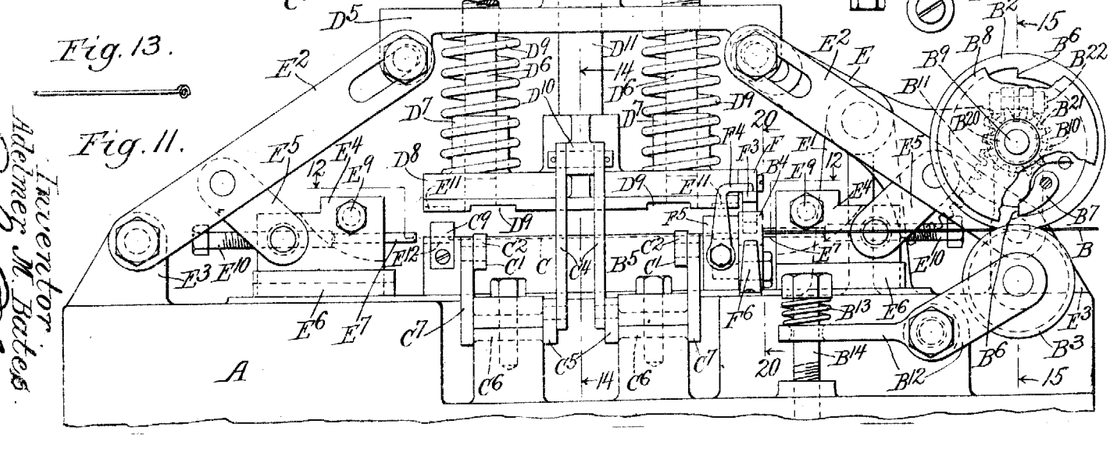
Fig. 11 is a detail on an enlarged scale in elevation of a portion of the tie forming means.
Fig. 13 is a detailed perspective view of one of the ties.
Figure 12:
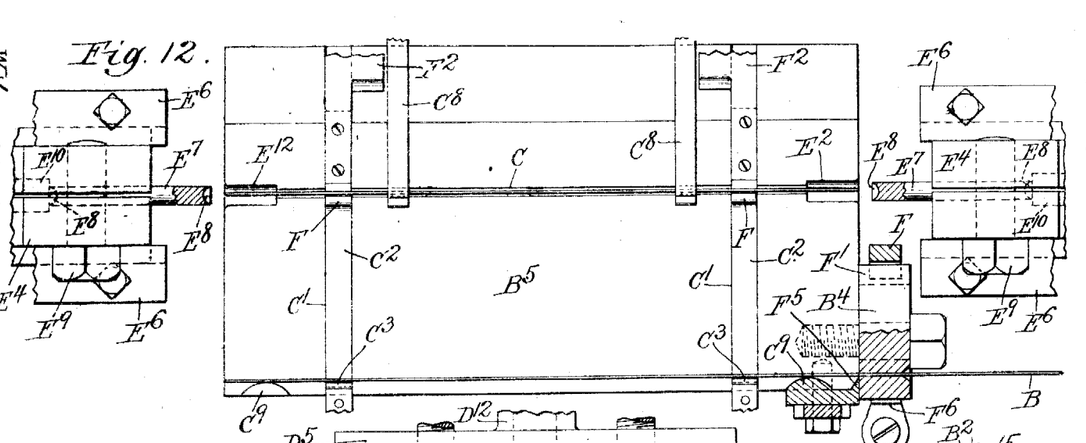
Fig. 12 is a section along the line 12—12 of Fig. 11.

The diagram within the line marked O—X represents the position of the parts at the beginning of a cycle with all the parts substantially in the position shown in the figures, particularly in the position shown in Figs. 11 and 14, expressed in terms of angular displacement of a given point on the master gear, starting at a zero position with the parts as shown in Fig. 11.

There are two main functions, namely, the forming of the tie, and the wrapping of the tie about the bag. The first of these functions may be sub-divided into the forming of the blank, and the forming of the tie therefrom. During the first half revolution $a$ of the master gear, the wire is being fed out across the table. Immediately after the end of the feeding movement, the wire is cut off during the interval *b*. The blank will lie on the table in the position left after the cutting movement until the completion of the revolution of the master timing gear, that is, during the interval *c*. Sometime during the intervals *b*, *c*, the feeding strips will pass back so that the first feeding hooks engage the blank, and at the commencement of the second revolution the blank will be fed forward into the groove in the table, so that at the end of the interval *d*, and during the interval *e*, the blank lies in position being gripped by the presser foot ready for heading. During the interval *f* the head is formed, the process being completed at the end of the first half of the second revolution of the timing gear. During the next half revolution interval *g*, the presser foot is rising, and the feed strips are moving back so that the second hook can engage the formed tie. It will be understood that this process does not necessarily consume the entire time, but nothing else is happening to the tie during that time, the tie being all the time at rest. At the end of the second complete revolution of the master timing gear, the tie is then at rest in the groove, so that at the commencement of the third revolution, during the interval *h*, the tie will be fed forward to the intermediate position between the tie forming mechanism and the twisting mechanism. The tie stays there during the remainder of the complete revolution of the timing gear, and on the next complete revolution will be moved forward during a corresponding interval $h^1$ to a position where it is ready to be seized by the twisting hooks. The tie is at rest in front of the twisting hooks during the interval *i*, and during the interval *j* the twister moves backward bending the wire about the neck of the bag in a substantially U-shaped position. During this interval, but terminating short of the end of the interval, as indicated for instance by $j^1$, the rack will have engaged the twisting spindle. During the interval *k*, the tie, spindle and rack are all at rest.

During the interval *l*, the rack ascends, twisting the tie about the bag. During the interval *m*, the twister without rotation is moved forward to its original position, disengaging itself from the tie, and leaving the tie and the bag at rest. During the latter part of the interval *m*, for instance during the interval *n*, the twisting rack will be disengaged by the cam. During the interval *o*, the table will be rotated one step.

I have not shown this diagram with absolute angular accuracy, but it is close enough to indicate the way in which the three general movements,—namely, the blank forming, the tie forming, and the wire tying movements,—overlap, and it also shows the way in which one or two other minor movements overlap on the whole. I have not indicated the disengagement of the bag from the table, nor the feeding of the bag to the table in the timing diagram, since this might take place at any time, and would in no wise affect the timing of the other movements. It will be understood that the intermediate position wherein the tie is allowed to rest, so that there is always one tie in the forming device, one tie in the twisting device, and one between, is only necessitated by the exigencies of design; but if it is desired to separate the forming and twisting devices, more intermediate ties would be used, or if desired to bring them closely together in use, this position would be dispensed with.

I claim:

1. A bag tying machine comprising means for forming a tie, means for puckering the neck of a bag, means for feeding the tie to the bag, and for twisting it about the neck thereof.

2. A bag tying machine comprising means for forming a tie, means for puckering the neck of a bag, means for feeding the tie to the bag, and means for bending it into a loop and then twisting it about the neck of a bag.

3. A bag tying machine comprising means for forming a tie, means for puckering the neck of a bag, means for feeding the puckered bag and the formed tie forwardly to a common meeting point, and means for twisting the tie about the puckered neck of the bag.

4. A bag tying machine comprising means for forming a tie, means for puckering the neck of a bag, means for feeding the puckered bag and the formed tie forwardly to a common meeting point, means for bending the tie into U-shape about the puckered neck of the bag and for twisting it to tighten it thereupon.

5. A bag tying machine comprising means for forming a tie, means for puckering the neck of a bag, means for feeding the puckered bag and the formed tie forwardly to a common meeting point, means for bending the tie into U-shape about the puckered neck of the bag and for twisting it to tighten it thereupon, and means for discharging the tied bag.

6. A bag tying machine comprising means for forming a tie, means for puckering the neck of a bag, means for positively holding and feeding the puckered bag and the formed tie forwardly to a common meeting point, and means for twisting the tie about the puckered neck of the bag.

7. A bag tying machine comprising means for forming a tie, means for puckering the neck of a bag, means for positively holding and feeding the puckered bag and the formed tie forwardly to a common meeting point, means for bending the tie into U-shape about the puckered neck of the bag and for twisting it to tighten it thereupon.

8. A bag tying machine comprising means for forming a tie, means for puckering the neck of a bag, means for positively holding and feeding the puckered bag and the formed tie forwardly to a common meeting point, means for bending the tie into U-shape about the puckered neck of the bag and for twisting it to tighten it thereupon, and means for discharging the tied bag.

9. A bag tying machine comprising means for forming a tie, means for puckering the neck of a bag, means for feeding the tie to the bag and for twisting it about the neck thereof, and a master timing and driving member, and means for driving all of said operating means in coördination therefrom.

10. A bag tying machine comprising means for forming a tie, means for puckering the neck of a bag, means for feeding the tie to the bag, and means for bending it into a loop and then twisting it about the neck of a bag, and a master timing and driving member, and means for driving all of said operating means in coördination therefrom.

11. A bag tying machine comprising means for forming a tie, means for puckering the neck of a bag, means for feeding the puckered bag and the formed tie forwardly to a common meeting point, and means for twisting the tie about the puckered neck of the bag, and a master timing and driving member, and means for driving all of said operating means in coördination therefrom.

12. A bag tying machine comprising means for forming a tie, means for puckering the neck of a bag, means for feeding the puckered bag and the formed tie forwardly to a common meeting point, means for bending the tie into U-shape about the puckered neck of the bag and for twisting it to tighten it thereupon, and a master timing and driving member, and means for driving all of said operating means in coördination therefrom.

13. A bag tying machine comprising means for forming a tie, means for puckering the neck of a bag, means for feeding the puckered bag and the formed tie forwardly to a common meeting point, means for bending the tie into U-shape about the puckered neck of the bag and for twisting it to tighten it thereupon, and means for discharging the tied bag, and a master timing and driving member, and means for driving all of said operating means in coördination therefrom.

14. A bag tying machine comprising means for forming a tie, means for puckering the neck of a bag, means for positively holding and feeding the puckered bag and the formed tie forwardly to a common meeting point, and means for twisting the tie about the puckered neck of the bag, and a master timing and driving member, and means for driving all of said operating means in coördination therefrom.

15. A bag tying machine comprising means for forming a tie, means for puckering the neck of a bag, means for positively holding and feeding the puckered bag and the formed tie forwardly to a common meeting point, means for bending the tie into U-shape about the puckered neck of the bag and for twisting it to tighten it thereupon, and a master timing and driving member, and means for driving all of said operating means in coördination therefrom.

16. A bag tying machine comprising means for forming a tie, means for puckering the neck of a bag, means for positively holding and feeding the puckered bag and the formed tie forwardly to a common meeting point, means for bending the tie into U-shape about the puckered neck of the bag and for twisting it to tighten it thereupon, and means for discharging the tied bag, and a master timing and driving member, and means for driving all of said operating means in coördination therefrom.

17. A rotary bag-feeding plate the periphery of which is provided with a series of separate bag-containing pockets and yielding bag-holding means within each of said pockets, said means comprising a substantially U-shape spring, the free arms of the spring being bent across one another and then bent back to form a normally closed spring clamp for the bag.

18. A rotary bag-feeding plate the periphery of which is provided with a series of separate bag-containing pockets, bag guide means arranged radially about said plate open for discharge of the bag into said bag-holding means.

19. A rotary bag-feeding plate the periphery of which is provided with a series of separate bag-containing pockets and yielding bag-holding means within each of said pockets, bag guide means arranged radially about said plate open for discharge of the bag into said bag-holding means.

20. A rotary bag-feeding plate the periphery of which is provided with a series of separate bag-containing pockets and yielding bag-holding means within each of said pockets, said means comprising a substantially U-shape spring, the free arms of the spring being bent across one another and then bent back to form a normally closed spring clamp for the bag, bag guide means arranged radially about said plate open for discharge of the bag into said bag-holding means.

21. A tie forming machine comprising a table having a grooved surface, means for feeding a length of wire onto said table, means for cutting it off to form a blank, means for feeding the blank to the groove.

means for holding it and upsetting the ends thereof to form a tie, and means for feeding the tie away from the groove.

22. A tie forming machine comprising a table having a grooved surface, means for feeding a length of wire onto said table, means for cutting it off to form a blank, means for feeding the blank to the groove, means for holding it and upsetting the ends thereof to form a tie, and means for feeding the tie away from the groove, the holding means comprising a presser foot free to move to and from the table, a supporting and driving member for the presser foot, and a driving connection therefrom for the upset means.

23. In a tie forming machine, a surface upon which the tie blank is adapted to rest, a presser foot and means for moving the presser foot toward and holding it against the surface to hold the blank in position, and a yielding connection between said presser foot and its supporting means to permit movement thereof after the foot has seated, and means responsive to such further movement for upsetting the ends of a blank to form a tie.

24. In a tie forming machine, a surface upon which the tie blank is adapted to rest, a presser foot and means for moving the presser foot toward and holding it against the surface to hold the blank in position, and a yielding connection between said presser foot and its supporting means to permit movement thereof after the foot has seated, and means responsive to such further movement for upsetting the ends of a blank to form a tie, said means comprising a pair of head-forming dies one on either end of the blank and a toggle connection between them and the supporting means.

In testimony whereof, I affix my signature in the presence of two witnesses this 4th day of May, 1915.

ADELMER M. BATES.

Witnesses:
  BESSIE S. RICE,
  MINNIE M. LINDENAU.